United States Patent
Seidel et al.

(10) Patent No.: US 12,534,818 B2
(45) Date of Patent: Jan. 27, 2026

(54) METHOD AND SYSTEM FOR EXTRACTING METAL AND OXYGEN FROM POWDERED METAL OXIDES

(71) Applicants: Airbus Defence and Space GmbH, Taufkirchen (DE); Fraunhofer-Gesellschaft zur Förderung der angewandten Forschung e.V., Munich (DE)

(72) Inventors: Achim O. Seidel, Taufkirchen (DE); Uday B. Pal, Framingham, MA (US); Peter Quadbeck, Dresden (DE); Astrid Adrian, Taufkirchen (DE)

(73) Assignees: Airbus Defence and Space GmbH, Taufkirchen (DE); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 1130 days.

(21) Appl. No.: 17/509,394

(22) Filed: Oct. 25, 2021

(65) Prior Publication Data
US 2023/0131891 A1    Apr. 27, 2023

(51) Int. Cl.
| | | |
|---|---|---|
| *C25C 5/00* | (2006.01) | |
| *C25C 7/02* | (2006.01) | |
| *C25C 7/04* | (2006.01) | |

(52) U.S. Cl.
CPC ............... *C25C 5/00* (2013.01); *C25C 7/02* (2013.01); *C25C 7/04* (2013.01)

(58) Field of Classification Search
None
See application file for complete search history.

(56) References Cited

U.S. PATENT DOCUMENTS

| | | |
|---|---|---|
| 5,976,345 A | 11/1999 | Pal et al. |
| 6,299,742 B1 | 10/2001 | Pal et al. |

(Continued)

FOREIGN PATENT DOCUMENTS

| | | |
|---|---|---|
| EP | 2764137 B1 | 4/2017 |
| EP | 2935656 B1 | 8/2017 |

(Continued)

OTHER PUBLICATIONS

Lomax, B. A. et al., "Proving the viability of an electrochemical process for the simultaneous extraction of oxygen and production of metal alloys from lunar regolith" Planetary and Space Science, Elsevier Ltd, Sep. 2019, pp. 1-10, vol. 180.

(Continued)

*Primary Examiner* — Brian W Cohen
*Assistant Examiner* — Abelline Katusiime Fionah
(74) *Attorney, Agent, or Firm* — Lerner David LLP

(57) ABSTRACT

A method for extracting metal and oxygen from powdered metal oxides in electrolytic cell is proposed, the electrolytic cell comprising a container, a cathode, an anode and an oxygen-ion-conducting membrane, the method comprising providing a solid oxygen ion conducting electrolyte powder into a container, providing a feedstock comprising at least one metal oxide in powdered form into the container, applying an electric potential across the cathode and the anode, the cathode being in communication with the electrolyte powder and the anode being in communication with the membrane in communication with the electrolyte powder, such that at least one respective metallic species of the at least one metal oxide is reduced at the cathode and oxygen is oxidized at the anode to form molecular oxygen, wherein the potential across the cathode and the anode is greater than the dissociation potential of the at least one metal oxide and (Continued)

less than the dissociation potential of the solid electrolyte powder and the membrane.

19 Claims, 2 Drawing Sheets

(56) References Cited

U.S. PATENT DOCUMENTS

| | | | |
|---|---|---|---|
| 2016/0032473 A1* | 2/2016 | Brinkman | C25C 7/02 |
| | | | 204/252 |
| 2021/0123148 A1 | 4/2021 | Haeming et al. | |

FOREIGN PATENT DOCUMENTS

| | | | |
|---|---|---|---|
| EP | 2430216 B1 | 8/2018 | |
| EP | 3161189 B1 | 8/2018 | |
| EP | 2640871 B1 | 10/2018 | |
| EP | 2640872 B1 | 3/2019 | |
| GB | 2534332 A | 7/2016 | |
| WO | WO-2007011669 A2 * | 1/2007 | C25C 7/04 |
| WO | 2017203245 A1 | 11/2017 | |

OTHER PUBLICATIONS

Extended European Search Report for Application No. 22201867.3 dated Apr. 6, 2023, pp. 1-6.

* cited by examiner

METHOD AND SYSTEM FOR EXTRACTING METAL AND OXYGEN FROM POWDERED METAL OXIDES

TECHNICAL FIELD

The invention relates to a method for extracting metal and oxygen from powdered metal oxides as well as a system for extracting metal and oxygen from powdered metal oxides.

BACKGROUND OF THE INVENTION

Various electrolysis devices having at least one cathode, which partially delimits a receiving area provided for receiving an oxide-containing feedstock in at least one operating condition, and having at least one anode are already known.

Devices for the production of metals and transition metals are exemplarily known from GB 2 534 332 A, EP 3 161 189 B1 and EP 2 935 656 B1. They operate by direct reduction of solid or powdered oxide-containing starting materials. Established electrolytic devices and electrolytic processes, such as the SOM process (see e.g. U.S. Pat. Nos. 5,976,345 A, 6,299,742 B1), or FFC process, are aimed in particular at the chemical reduction of metal oxides and transition metal oxides for the production of pure metals or alloys, for example for the production of magnesium, aluminium, silicon, titanium, or tantalum from their oxides.

The respective starting material is in electrical contact with a cathode, with molten halide salts used as an electrolyte. A respective anode assembly typically consists of a graphite or metallic rod, or an oxygen ion-conducting membrane in contact with an appropriate current collector. A DC voltage is applied between the cathode and the anode assembly at a working temperature of typically 700° C. to 1400° C. The electrochemical processes reduce the starting material to pure metal or alloy at the cathode, and oxygen or an oxygen product is produced at the anode.

Above-mentioned U.S. Pat. Nos. 5,976,345 A, 6,299,742 B1 describe electrolysis devices, in which the respective anode assemblies comprise an anode/current collector and an oxygen ion conducting membrane, which separates the respective anode from the electrolyte. Thus, the oxygen is separated from the electrolysis cell, and high-purity oxygen is directly produced. In order to increase the lifetime of a ceramic anode, the composition of the salt electrolyte is matched to the ceramics. Fluoride salt mixtures have been proven to be suitable for this application. For the industrial production of metals, devices and processes are used in particular in which several bipolar electrochemical cells are connected in series in an electrolyte bath.

From EP 2 430 216 B1, EP 2 640 871 B1, EP 2 764 137 B1 and EP 2 640 872 B1, continuous processes are known in which the electrolyte bath or the device is typically provided open to its/their surroundings at two points for the introduction and removal of freshly loaded cells or cell stacks. Furthermore, an integrated solution is known from WO 2017/203245 A1, consisting of devices and processes for the electrolytic production of metal powders and direct further processing by means of additive manufacturing processes.

U.S. Pat. No. 6,299,742 B1 and U.S. Pat. No. 5,976,345 A describe an in situ apparatus and technique for measuring the concentrations and transport properties of easily dissociable oxides in slags, utilizing an electrolyte to separate a reference-gas compartment from the slag of interest. A method and apparatus for metals extraction is also described, which includes a vessel for holding a molten electrolyte.

Space applications and sustainable exploration of space require, in particular, technologies that enable the use of locally available resources, ideally in their naturally occurring form. Of interest are space-qualified technologies for the production of oxygen, water, and fuel from materials present on the Moon, Mars, or in and/or on asteroids. The term "space-qualified" is to be understood as referring to a reusable, low-wear/maintenance device, a process without the use of consumables, and devices with a lightweight and compact design and/or high energy and/or material efficiency. This implies that the metal products obtained as a result of the electrochemical process must be separable from the other elements of the electrolytic cell easily and preferably in powdered form. The same applies to terrestrial applications of metal powder, such as the use of metal powder as an energy carrier in terrestrial energy storage system and/or heat-generating devices.

However, the operating temperature of the electrolysis is typically in a range between 700° C. to 1400° C. when molten halide salts are used as electrolytes. In this temperature range technologically interesting metals, such as Mg, Al, Fe may sinter, melt, or evaporate which is not desired if one wants to obtain the reduced metal in powdered form. Furthermore, following the electrochemical reduction the metal powders will be embedded in the salt electrolyte. Depending on the composition of the salt, the metal powders are separable from the salt by washing with a solvent, evaporation of the salt, or other means. These separation steps introduce additional complexity and effort which reduce the attractiveness of the process.

Summary of the Invention

It is an object of the invention to provide an alternative method for extracting metal and oxygen from powdered metal oxides, which leads to a more complete electro-lytic reduction and an easier separation of the metal powder. Furthermore, it would be beneficial to also increase the reaction rate and the production of high-purity oxygen.

The object is met by a method according to the features of independent claim 1. Advantageous embodiments and further improvements may be gathered from the subclaims and the following description.

A method for extracting metal and oxygen from powdered metal oxides in electrolytic cell is proposed, the electrolytic cell comprising a container, a cathode, an anode and an oxygen-ion-conducting membrane, the method comprising providing a solid oxygen ion conducting electrolyte powder into a container, providing a feedstock comprising at least one metal oxide in powdered form into the container, applying an electric potential across the cathode and the anode, the cathode being in communication with the electrolyte powder and the anode being in communication with the membrane in communication with the electrolyte powder, such that at least one respective metallic species of the at least one metal oxide is reduced at the cathode and oxygen ions are oxidized at the anode to form molecular oxygen, wherein the potential across the cathode and the anode is greater than the dissociation potential of the at least one metal oxide and less than the dissociation potential of the solid electrolyte powder and the membrane.

A receiving space of the electrolyte cell, which is created in the form of the container, may be defined by the cathode and the membrane, which are arranged at a distance to each other. The anode may be placed directly adjacent to the membrane at a side facing away from the cathode and in contact with the anode current collector material. In the container, i.e. between the cathode and the membrane, the electrolyte powder is arranged and surrounds feedstock particles. In doing so, the electrolyte powder is in contact with both the cathode and the membrane and provides a conducting path for oxygen ions from the oxide particles to the membrane.

Providing the electrolyte powder and the feedstock may also comprise mixing both components, such that substantially all feedstock particles are surrounded by or in contact with electrolyte powder particles. It may thus be feasible to use electrolyte powder having a mean particle size clearly below the mean particle size of the feedstock particles. The solid oxygen-ion conducting electrolyte powder material is intended to at least partially or completely fill the gaps between the metal oxide grains, in this sense it is advantageous for the solid oxide electrolyte powder to consist of small particles, for example nanoparticles with grain sizes below 1 micrometer. In contrast thereto, typical sizes of the feedstock particles may be in the micrometer range.

Upon applying the potential across the cathode and the anode, oxide ions will travel through the membrane and are collectable at the anode. At least one metal oxide in the feedstock will be reduced to metal and remain in the electrolytic particles. After the method, it can be separated from the electrolytic powder through a suitable mechanical process. The reduced metal will particularly comprise a particle size distribution similar to that of the original at least one metal oxide powder.

The method has the advantage that it produces metal powder and high purity oxygen simultaneously without impacting a grain size distribution of the feedstock particles, in particular without sintering, melting, evaporating the resulting metal powder, or dissolving the metal powder in a liquid electrolyte. Furthermore, the obtained metal powder is easily separable from the solid electrolyte through a mechanical process, which is described further below.

By eliminating molten salt electrolyte, the robustness and lifetime of a respective electrolytic cell and its elements is clearly increased. A more complete oxide reduction with high current densities and reaction rates is facilitated by the introduction of said oxygen-ion conducting solid electrolyte powder along with the at least one metal oxide. The method is applicable to a wide range of metals, alloys, and metal/alloy mixtures, including but not limited to iron oxide and regolith, by proper selection of the solid electrolyte. Still further, high temperatures are not required. This also allows substances to be reduced that have a high vapor pressure in the reduced state and are therefore volatile. The use of low temperatures also results in suitability for systems that form liquid phases in the reduced state at low temperatures. Another advantage is that high-purity oxygen which is a valuable product is produced in parallel to the metal powder.

The method may further comprise mixing the electrolyte powder and the feedstock. Mixing the electrolyte powder and the feedstock may be conducted by simultaneously providing the electrolyte powder and the feedstock, such that both reach the container at the same time and disperse substantially evenly. Also, both elements may be mixed before being put into the container, e.g. in a separate device. Here, a mechanical mixing device may be arranged in a mixing chamber, which is fillable with the feedstock and the electrolytic powder. A goal is to provide a sufficient distribution of the electrolyte powder around the feedstock particles, such that electric paths between the cathode and the anode are created.

The feedstock may comprise at least one of a group of materials or a chemical compound comprising at least one of the group of materials, the group consisting of iron, titanium, regolith, or any other suitable oxide material. Regolith may comprise several different metal oxide compounds, which may also comprise aluminium, magnesium, and silicon.

The electrolyte powder may comprise at least one of a group of materials, the group consisting of rare earth or alkaline earth-doped zirconia-, ceria-, hafnia-, and thoria-based oxides or any other suitable oxide material. The choice depends on the overall process conditions, the respective at least one metal oxide to be reduced, operating temperature, and intended current densities. Preferred materials of the solid electrolyte powder material may be yttria-stabilized zirconia, scandia- or ceria stabilized zirconia, other oxygen ion conducting materials or mixed oxygen-ion electronic conductors.

The electrolyte powder may furthermore comprise mixed oxygen ion electronic conductors, which improves the ion transfer to the anode.

Furthermore, the oxygen ion-conducting membrane may be selected from a group of materials, the group comprising rare earth or alkaline earth-doped zirconia-, ceria-, hafnia-, and thoria-based oxides. It is particularly advantageous if the membrane comprises yttria-stabilized zirconia.

As explained above, a mean particle size of the solid electrolyte powder may preferably be less than a mean particle size of the feedstock powder. Nanosized particles of the solid oxygen-ion conducting electrolyte powder has favorable properties for oxygen ion conduction and are therefore well suited for the method. Depending on the size ratio between the solid oxide electrolyte powder particles and the feedstock particles, larger sizes may also be suitable.

The electrolytic cell may be operated at a temperature greater than about 500° C. In particular, the electrolytic cell is operated at a temperature in the range of about 500° C. to about 1300° C. By using these moderate temperatures it is possible to reduce substances that have a high vapor pressure in the reduced state and are therefore volatile. The use of low temperatures also results in suitability for systems that form liquid phases in the reduced state at low temperatures.

The method may further comprise collecting molecular oxygen at the anode. With the method described herein, high-purity oxygen which as a valuable product is produced in parallel to the metal powder.

The method may further comprise arranging a conducting structure into a space between the cathode and the anode in electrical contact with the cathode as a preparatory step before applying the electric potential. Thus, the cathode contact area is increased, which results in a more complete oxide reduction with higher current densities and reaction rates. Also, the electric resistance in the electrolytic cell is reduced.

Further, the method may comprise separating obtained metal from the electrolyte powder through a separation process, the separation process being selected from a group of separation processes, the group comprising:
sieving,
vibration separation,
magnetic separation,
electrostatic separation,
air classification,
sedimenting, and a combination thereof.

The invention further relates to a system for extracting metal and oxygen from powdered metal oxides, the system comprising an electrolytic cell having a container, a cathode, an anode and an oxygen-ion-conducting membrane, a solid oxygen ion conducting electrolyte powder, and a power supply, wherein the cathode and the anode are arranged at a distance to each other on the container to form a receiving space, wherein the membrane is arranged between the cathode and the anode and contacts the anode, wherein the electrolytic powder is provided in the receiving space in communication with the cathode and the membrane, wherein the power supply is connectable to the cathode and the anode to selectively apply an electric potential across the cathode and the anode, wherein the system is adapted for reducing at least one respective metallic species of at least one metal oxide of feedstock mixed into and surrounded by the electrolyte powder by applying the electric potential, wherein the potential is greater than the dissociation potential of the at least one metal oxide and less than the dissociation potential of the solid electrolyte powder and the membrane.

In the system, the electrolyte powder may comprise at least one of a group of materials, the group consisting of rare earth or alkaline earth-doped zirconia-, ceria-, hafnia-, and thoria-based oxides.

The electrolyte powder may comprise mixed oxygen ion electronic conductors.

The oxygen ion-conducting membrane may be selected from a group of materials, the group comprising rare earth or alkaline earth-doped zirconia-, ceria-, hafnia-, and thoria-based oxides, in particular yttria-stabilized zirconia.

The system may further comprise a conducting structure, in particular pins and/or at least one wire mesh, in the receiving space between the cathode and the anode in electrical contact with the cathode. The pins may extend from the cathode in the direction of the anode. The pins may be provided in the form of an array and may particularly constitute a regular pattern at least in a section. The at least one wire mesh may comprise a plurality of mesh cells arranged on a common plane, in particular in form of a regular pattern.

The system may further comprise an array of anodes, in particular capillary anodes, extending in direction of the cathode. The capillary anodes may be realized as one end closed tubes with a current collector.

The conducting structure comprises at least one wire mesh, wherein the capillary anodes are at least partially surrounded by mesh cells. Thus, the average distance between the cathode and the anode is reduced. Furthermore, the reaction rate is increased.

BRIEF DESCRIPTION OF THE FIGURES

In the following, the attached drawings are used to illustrate exemplary embodiments in more detail. The illustrations are schematic and not to scale. Identical reference numerals refer to identical or similar elements. They show.

DETAILED DESCRIPTION OF EXEMPLARY EMBODIMENTS

Figure 1:
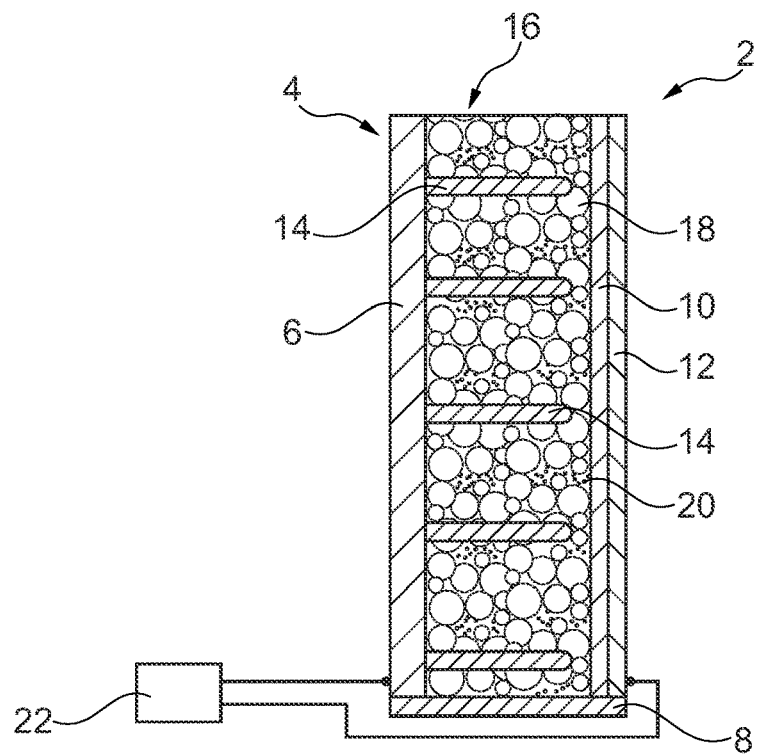
FIG. 1 a simplified sectional view of the system in an embodiment of the system, FIG. 2 a simplified sectional view of the system in another embodiment of the system, and FIG. 3 a method in a block-oriented, schematic view.

FIG. 1 shows a system 2 for extracting metal and oxygen from powdered metal oxides. The system 2 has an electrolytic cell 4, which comprises a cathode metal plate 6, an insulating bottom plate 8, a solid oxide membrane plate 10 and in electrical contact with an anode current collector 12. The cathode 6, the anode 12 and the bottom plate 8 form a container. Metal pins 14 are in direct contact with the cathode 6 and protrude towards the anode 12.

In a receiving space 16 between the cathode 6 and the membrane 10 a metal oxide powder 18 is arranged and surrounded by solid electrolyte powder 20. The metal oxide powder 18 and the electrolyte powder 20 are mixed, such that the spaces between particles of the metal oxide powder 18 are filled with the electrolyte powder 20. For this, the mean particle size of the metal oxide powder 18 clearly exceeds the mean particle size of the electrolyte powder 20.

A power supply 22 is connected to the anode 6 and the cathode 12. It is designed to apply an electric potential between the anode 6 and the cathode 12. Resultingly, metal oxide in the metal oxide powder 18 is reduced to metal and molecular oxygen is collected at the anode 12. During this process, conducting paths for oxygen ions are used, which are created by the electrolyte powder 20 between the individual particles of the metal oxide powder 18, are used. Due to the pins 14 extending towards the anode 12, the mean distance between the cathode 6 and the anode 12 is reduced.

The reduced metal powder produced as result of the reduction remains in the receiving space 16. After the electrolysis the mixture of the electrolytic powder and the metal powder is removed from the electrolytic cell 4. The metal and the electrolyte powder 20 are separated from each other, and the solid electrolyte powder can be re-used for the next batch of electrolysis with a new load of metal oxide powder 18.

Figure 2:
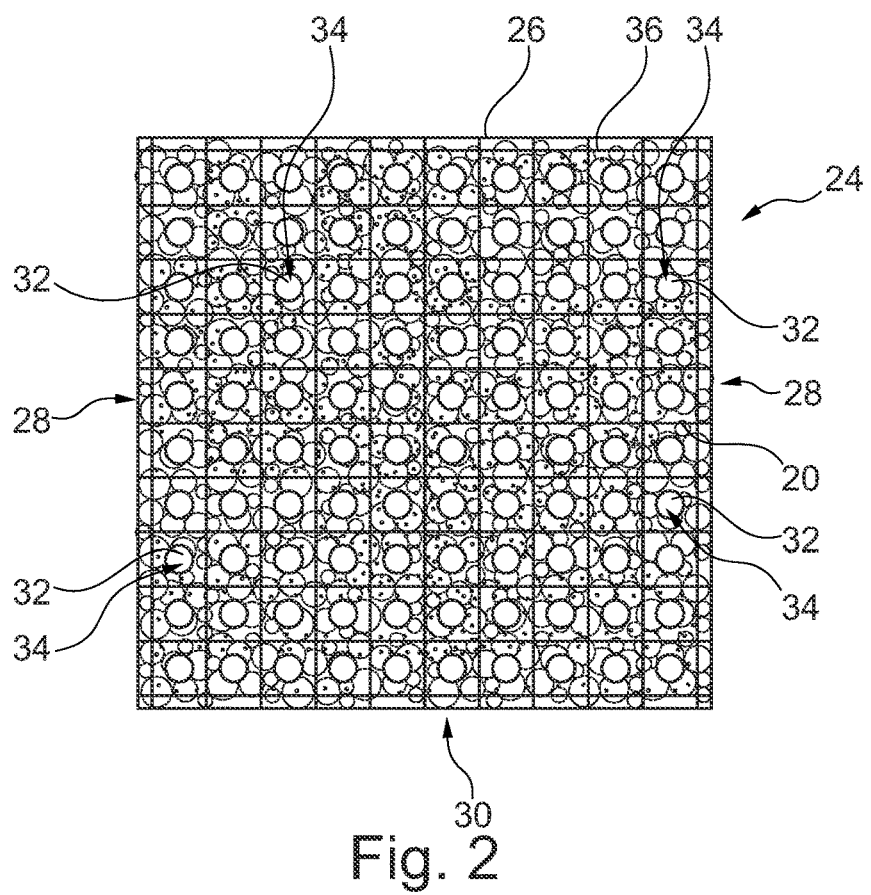

FIG. 2 shows an electrolytic cell 24 with a modified design. Here, a cathode 26 is formed as a container and includes side walls 28 and a bottom plate 30 and an array of solid oxide membrane anodes 32, each of which is shaped as a one end closed tube with a current collector 34 inside. The membrane anodes 32 are created by coating anodes with the respective membrane material.

A wire mesh structure 36 is connected to the cathode 26 and partially fills a space between the anodes 32 and the cathode 26 to reduce the average distance between the anodes 32 and elements that provide the cathodic potential. The remaining space between the anodes 32 is filled with a mixture of the metal oxide powder 18 to be reduced and the solid electrolyte powder 20. As in the previous embodiment, the average particle size of the electrolyte powder is clearly lower than the average particle size of the metal oxide powder. Thus, the electrolytic powder thereby fills the gaps between the particles of the metal oxide 18 and provides a conducting path for oxygen ions produced as a result of the reduction towards the solid oxide membrane.

Upon applying the cell potential between the anodes 32 and the cathode 28, molecular oxygen is collected at the anodes 32, and the reduced metal powder produced as result of the reduction is available within the volume of the cathode 28. As described regarding the previous embodiment, the metal powder can be separated after the electrolysis and the electrolyte powder is reusable.

Figure 3:
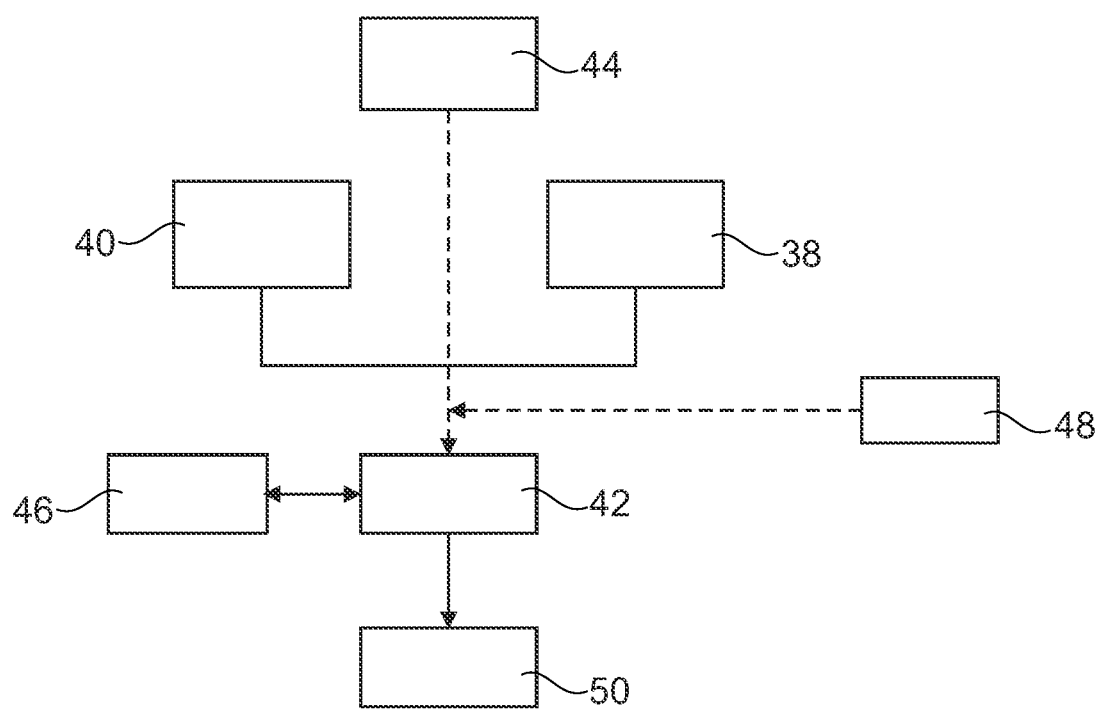

FIG. 3 shows a method for extracting metal and oxygen from powdered metal oxides in an electrolytic cell, comprising a container, a cathode, an anode, and an oxygen-ion-conducting membrane. The method comprises providing 38 a solid oxygen ion conducting electrolyte powder into a container, providing 40 a feedstock comprising at least one metal oxide in powdered form into the container, applying 42 an electric potential across the cathode and the anode, the cathode being in communication with the electrolyte powder and the anode being in communication with the membrane in communication with the electrolyte powder, such that at least one respective metallic species of the at least one metal oxide is reduced at the cathode and oxygen is oxidized at the anode to form molecular oxygen. The potential across the cathode and the anode is greater than the dissociation potential of the at least one metal oxide and less than the dissociation potential of the solid electrolyte powder and the membrane. The electrolyte powder and the feedstock may be mixed 44 before or after providing them. During the reduction process, molecular oxygen can be collected 46 at the anode.

As a preparatory step, a conducting structure, such as a wire mesh, can be arranged 48 into a space between the cathode and the anode in electrical contact with the cathode before applying the electric potential. After the electrolysis process, obtained metal is separated 50 from the electrolyte powder through a separation process.

REFERENCE NUMERALS 2 system
4 electrolytic cell
6 cathode
8 bottom plate
10 membrane
12 anode
14 metal pin
16 receiving space
18 metal oxide powder (feedstock)
20 electrolyte powder
22 powder supply
24 electrolytic cell
26 cathode
28 side wall
30 bottom plate
32 membrane anode
34 current collector
36 wire mesh
38 providing electrolyte
40 providing feedstock (metal oxide powder)
42 applying electric potential
44 mix electrolyte and feedstock
46 collect oxygen
48 arrange conducting structure
50 separate metal

The invention claimed is:

1. A method for extracting metal and oxygen from powdered metal oxides in an electrolytic cell, comprising a container, a cathode, an anode and an oxygen-ion-conducting membrane, the method comprising:
providing a solid oxygen ion conducting electrolyte powder into the container, wherein the solid oxygen ion conducting powder comprises at least one of a group of materials, the group of consisting of rare earth or alkaline earth-doped zirconia-, ceria-, hafnia- or thoria-based oxides,
providing a feedstock comprising at least one metal oxide in powdered form into the container,
applying an electric potential across the cathode and the anode, the cathode being in communication with the solid oxygen ion conducting powder and the anode being in communication with the membrane, the membrane being in communication with the solid oxygen ion conducting powder, such that at least one respective metallic species of the at least one metal oxide is reduced at the cathode and oxygen is oxidized at the anode to form molecular oxygen,
wherein the potential across the cathode and the anode is greater than the dissociation potential of the at least one metal oxide and less than the dissociation potential of the solid oxygen ion conducting powder and the membrane.

2. The method of claim 1, further comprising mixing the solid oxygen ion conducting powder and the feedstock.

3. The method of claim 1, wherein the feedstock comprises at least one of a group of materials or a chemical compound comprising at least one of the group of materials, the group consisting of:
iron,
titanium,
regolith.

4. The method of claim 1, wherein the solid oxygen ion conducting powder comprises mixed oxygen ion electronic conductors.

5. The method of claim 1, wherein the oxygen ion-conducting membrane is selected from a group of materials, the group comprising rare earth or alkaline earth-doped zirconia-, ceria-, hafnia-, and thoria-based oxides.

6. The method of claim 5, wherein the membrane comprises yttria-stabilized zirconia.

7. The method of claim 1, wherein a mean particle size of the solid electrolyte powder is less than a mean particle size of the feedstock powder.

8. The method of claim 1, wherein the electrolytic cell is operated at a temperature greater than about 500° C.

9. The method of claim 1, wherein the electrolytic cell is operated at a temperature in the range of about 500° C. to about 1300° C.

10. The method of claim 1, further comprising collecting molecular oxygen at the anode.

11. The method of claim 1, further comprising arranging a conducting structure into a space between the cathode and the anode in electrical contact with the cathode as a preparatory step before applying the electric potential.

12. The method of claim 1, further comprising separating obtained metal from the solid oxygen ion conducting powder through a separation process, the separation process being selected from a group of separation processes, the group comprising:
sieving,
vibration separation,
magnetic separation,
electrostatic separation,
air classification,
sedimenting, and
a combination thereof.

13. A system for extracting metal and oxygen from powdered metal oxides, the system comprising:
an electrolytic cell having a container, a cathode, an anode, and an oxygen-ion-conducting membrane,
a solid oxygen ion conducting powder, wherein the solid oxygen ion conducting powder comprises at least one of a group of materials, the group consisting of rare earth or alkaline earth-doped zirconia-, ceria-, hafnia-, and thoria-based oxides, and
a power supply,
wherein the cathode and the anode are arranged at a distance to each other in the container to form a receiving space,
wherein the membrane is arranged between the cathode and the anode and contacts the anode, wherein the solid oxygen ion conducting powder is provided in the receiving space in communication with the cathode and the membrane, wherein the power supply is connectable to the cathode and the anode to selectively apply an electric potential across the cathode and the anode, wherein the system is adapted for reducing at least one respective metallic species of at least one metal oxide of feedstock mixed into and surrounded by the solid oxygen ion conducting powder by applying the electric potential, wherein the potential is greater than the dissociation potential of the at least one metal oxide and less than the dissociation potential of the solid oxygen ion conducting powder and the membrane.

14. The system of claim 13, wherein the solid oxygen ion conducting powder comprises mixed oxygen ion electronic conductors.

15. The system of claim 13, wherein the oxygen ion-conducting membrane is selected from a group of materials, the group comprising rare earth or alkaline earth-doped zirconia-, ceria-, hafnia-, and thoria-based oxides.

16. The system of claim 13, further comprising a conducting structure in the receiving space between the cathode and the anode in electrical contact with the cathode.

17. The system of claim 13, further comprising an array of anodes, extending in direction of the cathode.

18. The system of claim 16, wherein the conducting structure comprises at least one wire mesh.

19. The system of claim 15, wherein the oxygen ion-conducting membrane is yttria-stabilized zirconia.

* * * * *